UNITED STATES PATENT OFFICE.

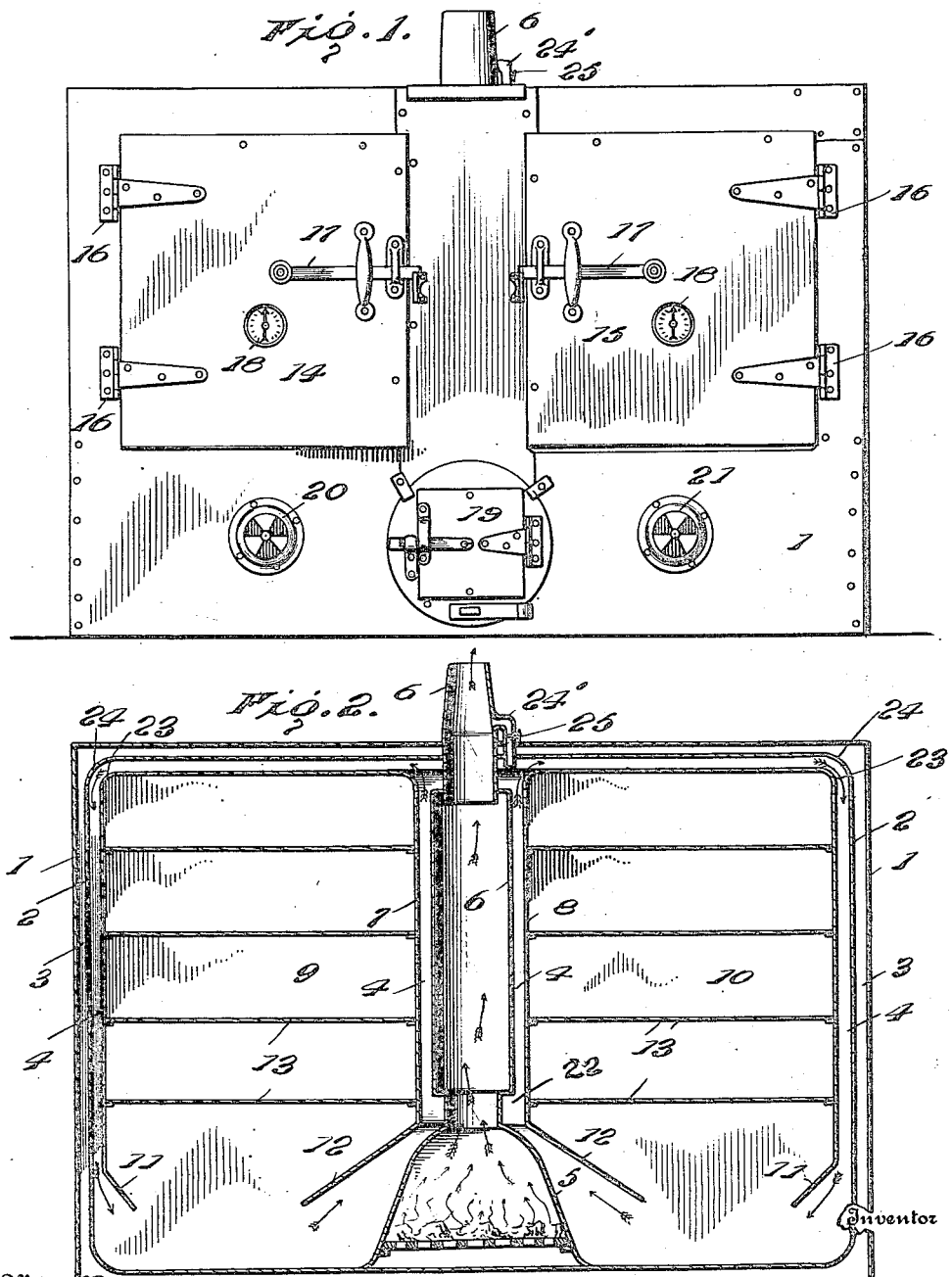

ALLAN B. KINGSLAND, OF BURLINGTON, VERMONT.

PORTABLE OVEN.

No. 873,558.     Specification of Letters Patent.     Patented Dec. 10, 1907.

Application filed August 20, 1906. Serial No. 331,404.

*To all whom it may concern:*

Be it known that I, ALLAN B. KINGSLAND, a citizen of the United States, residing at Burlington, in the county of Chittenden and State of Vermont, have invented certain new and useful Improvements in Portable Ovens; and I do hereby declare the following to be a full, clear, and exact description of the invention, such as will enable others skilled in the art to which it appertains to make and use the same.

My invention relates to improvements in portable baking apparatus.

The object of my invention is to provide a portable baking apparatus of the character described, in which a continuous flue is arranged around the cooking compartment, for the passage of a current of air heated by a fire chamber, and thus more quickly, uniformly and economically heating the interior of the oven.

Another object of my invention is to provide a more simple, cheap and effective oven of this character.

In the accompanying drawings, Figure 1, is a front elevation of an improved oven embodying my invention. Fig. 2, is a vertical transverse sectional view of Fig. 1.

Referring now to the drawings, 1 represents the outer casing of my improved oven which, as shown, is made of sheet metal, and preferably of a rectangular form. Within the outer casing, and spaced a short distance therefrom, is a second casing 2 which forms a dead air space 3 surrounding the heating space, as will be hereinafter more fully described. The said oven formed as above described, has at its lower end at the center, a fire box 5 which extends across the lower end of the casing from the front to the rear wall, and is made air-tight to prevent the gases and products of combustion from escaping into the heating space 4. The said fire box 5 has in communication therewith the upwardly extending vertical flue 6 which is near the rear of the fire box, and extends out through the upper face of the inner and outer casing 1 and 2, and is connected to the chimney or other flue in any desired manner.

Within the casings 1 and 2 on each side of the fire box are two casings 7 and 8 which extend from the front wall to the rear wall of the casing 2, and form the two ovens 9 and 10, one on each side of the fire box. The casings are spaced a sufficient distance from the inner casing 2 so as to form a space around the sides, top and bottom of the ovens to form the heating space 4. The casings 7 and 8 of the ovens proper have their lower ends extending obliquely downwardly at 11 and 12, and are opened so as to allow the heated air of the space 4 to pass within the oven and aid in the baking, and assist in the ventilation thereof.

The oven is provided with any desired number of shelves 13, and access is had to the two ovens 9 and 10 by the doors 14 and 15 which are hinged at 16 and fastened by catches 17, the said doors being of a size approximately that of the interior of the oven, so that the articles to be baked can be readily inserted or removed. The said doors are provided with thermostats 18 by means of which the temperature of the ovens is readily determined from the outside. The front end of the casing at the center, and the lower end, is provided with a door 19 which communicates with the fire pot 5, and through which the fuel is fed to the fire. The lower end of the casing at each side of the fire door 19 is provided with a damper 20 and 21 which register with the enlarged heading space 21' below the ovens in the passage 5, and thus the temperature of the air in said space may be raised or lowered as desired.

The arrangement of the two ovens is such that there is a large space 22 between the same, and directly over the fire pot, and thus the air within said space becomes thoroughly heated and ascends. The corners of the ovens being curved if desired as indicated at 23, and the inner casing 2 also being curved at the corners, as indicated at 24, forms a passage 4 around the oven in which the heated air from the large space 22 will freely pass, and will not be impeded by the sharp corners. The heated air ascends within the large passage 22 and divides and passes in opposite directions around the upper portions of the oven, and down around the side across the bottom, and is again brought into contact with the fire pot 5 and is re-heated and carried around the oven. From this description, it will be seen that the same air is heated over and over again, and after the desired temperature is reached in the oven, it will be made easier to regulate the oven and keep a more even temperature. This construction and arrangement of parts is a more simple, cheap and effective means of heating, as the heated air as it passes around the oven may enter the same and keep the oven the same temperature throughout its whole area. Connected with the large space 22 at its upper end is a pipe 24' which passes out through the inner and outer casings 1 and 2, and is in communication with the stove pipe or flue 6. Said pipe 24' is provided with a cock or damper 25, and thus any moisture within the heating space 4 may be drawn off through the pipe, as often such moisture or vapor will accumulate within this space from the bread or other articles being baked.

Having thus described my invention, what I claim and desire to secure by Letters Patent, is:—

1. A baking apparatus, comprising a casing, a fire pot within the casing, a flue conveying the products of combustion from the fire pot upwardly through the casing, and an oven within the casing and spaced a distance therefrom forming a hot air space surrounding the sides, top and bottom of the oven, and in which the heated air is adapted to circulate.

2. A baking apparatus comprising a casing, a fire pot within the casing, a flue conveying the products of combustion from the fire pot upwardly through the casing, and an oven within the casing and spaced a distance therefrom forming a hot air space surrounding the sides, top and bottom of the oven and said hot air space in communication with the oven.

3. A baking apparatus comprising a casing, a fire pot within the casing, a flue conveying the products of combustion from the fire pot upwardly through the casing, an oven within the casing and spaced a distance therefrom forming a hot air space surrounding the sides, top and bottom of the oven and said hot air space in communication with the oven and the casing having an opening in communication with the outside atmosphere, and having a damper controlling the same, whereby the heat is regulated within the hot air space.

4. A baking apparatus comprising a casing an inner casing within the casing, an oven within the inner casing and spaced a distance therefrom forming a hot air circulating passage, said oven having an open bottom in communication with the passage, and a fire pot within the casing and adapted to heat the air within the passage and cause the circulation of air around the oven through the passage.

5. A baking apparatus, comprising a casing, a fire pot located centrally therein and extending across the casing, a flue in communication with the fire pot and extending upwardly through the casing, and an oven situated within the casing above the fire pot on each side of the flue, and spaced a distance from the casing to form passages surrounding the sides, top and bottom of the ovens, and said ovens having open lower ends in communication with the passages, whereby the air is caused to circulate around and through the oven, and dampers within the casing and communicating with the passages.

6. A baking apparatus, comprising a casing, a fire pot located centrally therein and extending across the casing, a flue in communication with the rear end of the fire pot and extending upwardly through the casing, and an oven having preferably rounded corners situated within the casing above the fire pot on each side of the flue and spaced a distance from the casing to form passages surrounding the sides, the top and bottom of the ovens, said ovens having open lower ends in communication with the passages, whereby the air, as it is heated, is caused to circulate around the oven doors carried by the casing, and communicating with the ovens, dampers within the casing and communicating with the hot air passage, and a pipe in communication with the hot air passage between the ovens and extending through the casing, and in communication with the flue.

7. A baking apparatus, comprising a casing, a fire pot located therein, a flue in communication with the fire pot and extending upwardly through the casing, an oven within the casing and spaced a distance from the casing to form a passage surrounding the sides, top and bottom of the oven, and the oven having its bottom formed of two inclined plates leaving an opening between the same to form a communication between the oven and the hot air space.

In testimony whereof I do affix my signature, in presence of two witnesses.

ALLAN B. KINGSLAND.

Witnesses:
ANDREW W. SOULE,
GARDNER S. BLODGETT.